United States Patent [19]

Carbrey

[11] 3,804,989

[45] Apr. 16, 1974

[54] TIME DIVISION COMMUNICATION SYSTEM

[75] Inventor: Robert Lawrence Carbrey, Boulder, Colo.

[73] Assignee: Bell Telephone Laboratories Incorporated, Murray Hill, N.J.

[22] Filed: July 31, 1972

[21] Appl. No.: 276,833

[52] U.S. Cl. ..... 179/15 AT, 179/15 AQ, 179/15 AA

[51] Int. Cl. .............................................. H04j 3/02

[58] Field of Search ........ 179/15 AA, 15 A, 15 AQ, 179/15 AT, 1 CN, 18 BC

[56] References Cited

UNITED STATES PATENTS

| | | | |
|---|---|---|---|
| 3,617,643 | 11/1971 | Nordquist | 179/15 AQ |
| 3,469,255 | 9/1969 | Hoffman | 179/15 AA |
| 3,233,043 | 2/1966 | Shimasaki | 179/15 AA |
| 3,745,253 | 7/1973 | Carbrey | 179/15 AT |
| 3,742,147 | 6/1973 | Carbrey | 179/15 AT |
| 3,689,896 | 9/1972 | Dimmick | 179/15 AA |

FOREIGN PATENTS OR APPLICATIONS

| | | | |
|---|---|---|---|
| 1,285,015 | 9/1967 | Germany | 179/15 A |
| 1,120,492 | 7/1968 | Great Britain | 179/15 AA |

*Primary Examiner*—Kathleen H. Claffy
*Assistant Examiner*—Thomas D'Amico
*Attorney, Agent, or Firm*—J. S. Cubert

[57] ABSTRACT

A time division communcation system wherein a plurality of time slots occurs in repetitive cycles includes a plurality of stations, first and second buses, a control signal source and a coupling circuit operative in each time slot to sum all signals applied to the second bus and to apply the resultant sum signal to the first bus. Each station has an associated circuit including first and second stores. The first bus signal is applied to the first store in response to the control signal and is coupled via a coupling device to the station. The coupler is arranged so that the second store only stores the station outgoing signal. In response to the control signal, the second store is disconnected from the coupling device; and the station outgoing signal from the second store is applied to the second bus and also to the first store wherein it is subtracted from the first bus signal. The control signal is applied to selected station circuits in a distinct time slot whereby signals are exchanged among the selected stations.

23 Claims, 11 Drawing Figures

TIME DIVISION COMMUNICATION SYSTEM

BACKGROUND OF THE INVENTION

My invention relates to communication systems and more particularly to information transfer arrangements in a time division communication system.

Time division communication systems permit a plurality of concurrent information exchanges over a common communication link. Each exchange is assigned to a particular time slot of a repetitive group of time slots. During the repetitive time slot group, a plurality of information sample exchanges are sequentially completed over the common link. In one such time slot, the information from each line assigned to the connection in the time slot is sampled and the sample is transferred to the other assigned lines via the common link. The common link is available to other line connections during the remaining time slots of the repetitive time slot cycle. As is well known in the art, the sampling rate for the line connections may be selected to provide an accurate information transfer between selectively interconnected lines. Where the sampling rate is periodic and greater than twice the highest frequency to be transferred, the signal transmission may be without loss.

In some prior art time division communication systems, a resonant transfer between a pair of line associated storage devices is utilized to accomplish the information exchange in a distinct time slot. This type of transfer requires a relatively precise network for the information exchange which network includes inductive elements and the line associated storage caacitors. The network elements are specially selected for precisely timed signal transfers. Since the energy exchanged in each time slot is limited to a small time sample of the signal, a relatively large amount of power is needed for each exchange and only a small portion of the energy transferred by means of resonant transfer lies within the desired frequency range. Thus, the electronic switches interconnecting the selected lines in a time slot must have very low losses and must be precisely timed. Additionally, the conversion of the exchanged information from sampled form to analog signals requires a complex filter associated with each line storage device to provide maximum transfer of the limited energy available in the desired band.

In other time division signal transfer systems, a sample signal from a storage device is transferred directly to a second storage device wherefrom the stored sample is made available for an extended period of time. This sample and hold switching arrangement provides a larger signal component in the desired band so that the filter requirements are simplified and, further, inductive elements are eliminated in the transfer network. But, the sample and hold technique has generally required at least two successive time intervals to complete the signal transfer between a pair of lines. Other forms of sample and hold time division transfer systems such as illustrated in my copending application Ser. No. 224,780 filed Feb. 9, 1972 provide a signal transfer between a pair of lines on a time division basis in a single time interval. These arrangements, however, require the use of three or more time division buses and are limited to signal transfers between a pair of lines in each time slot.

BRIEF SUMMARY OF THE INVENTION

My invention is a time division communication arrangement wherein a plurality of time slots occurs in repetitive cycles that serves a plurality of stations and includes first and second buses, a control signal source, and a coupling circuit connected between the first and second buses. Each station has an associated circuit comprising first and second stores, and a coupler operative to couple the first store to said station. In response to a control signal from said source, a first signal from the first bus is applied to the first store. The first store signal is transferred via said coupler to said station. The second store is normally connected to the coupler and to the station and is operative to store only the signal from said station. In response to the control signal, the second store is disconnected from the coupler and the station and is coupled to the second bus whereby the station signal in the second store is applied to said second bus. The control signal is applied to a plurality of selected station circuits in a distinct time slot. The station signals on the second bus are summed in said coupling circuit and the sum of the selected station signals is applied as the first signal to each selected station circuit first store via the first bus.

According to one aspect of the invention, the station circuit coupler comprises an amplifying device having an input, and first and second outputs. The input is connected to the first store; the first output is normally connected to one terminal of the second store; and the second output is normally connected to the other terminal of the second store. In response to the first store signal, equal signals appear on the first and second outputs; and there is no resulting signal placed in the second store responsive to the first store signal.

According to another aspect of the invention, the second store is connected to the coupler first and second outputs via a pair of normally closed switches. A pair of normally open switches are operative to serially connect the second store to the second bus through a coupling device. In response to the control signal, the normally closed switches are opened and the normally open switches are closed whereby the second store is coupled to the second bus. Advantageously, eacy switch may comprise an insulated gate field effect transistor (IGFET) having a source-drain path and a gate electrode responsive to the control signal to reverse the conductive state of the associated IGFET switch.

According to another aspect of the invention, each station circuit further includes means responsive to the control signal for applying the station signal from the second store to the first store wherein the applied station signal is subtracted from the sum signal received from the first bus. In this manner, only the incoming signals from other connected station circuits are applied to the associated station.

According to another aspect of the invention, the station is connected to the station circuit via a balanced line. The second store comprises a pair of stores and the coupler comprises amplifying means having an input connected to the first store and first, second, third and fourth outputs. One of the store pair is normally connected between the first and second outputs, and the other of the store pair is normally connected between the third and fourth outputs. The signals on the first and second outputs responsive to the first store signal are equal and in phase with the input signal. The signal on the third and fourth outputs are euqal and of opposite phase to the input signal whereby there is no resulting signal placed in the stored pair responsive to the first store signal. The second and fourth output are normally connected to the balanced line so that one phase of the station outgoing signal is placed in one of the store pair and the other phase of the station outgoing signal is stored in the other of the store pair. In response to the control signal, the pair stores are serially coupled to the second bus so that the stored station outgoing signal is applied to the second bus. Advantageously, any longitudinal component of the station outgoing signal from the balanced line is canceled when the pair stores are serially connected.

In one embodiment illustrative of my invention, each of the first and second stores of a station circuit comprises a storage capacitor and the coupler comprises first and second IGFET amplifiers. One terminal of the first storage capacitor is connected to the first bus via an IGFET switch and is further connected to the control electrode of each IGFET amplifier. The second storage capacitor is connected across the drain electrodes of the first and second IGFET amplifiers via a pair of normally closed IGFET switches. The first storage capacitor signal is applied to the control electrodes of the IGFET amplifiers and the drain electrode of the first IGFET amplifier is also connected to the station whereby the first storage capacitor signal is transferred to the station via the first IGFET amplifier and the station outgoing signal is transferred to the second storage capacitor via a normally closed IGFET switch.

In response to the control signal, the normally closed IGFET switches are opened and the second storage capacitor is connected via a pair of now closed normally open IGFET switches to the control electrode of a nearly unity gain noninverting IGFET amplifier. The output of the last mentioned amplifier is connected through an IGFET switch to the second bus. In this way, the station signal voltage from the second storage capacitor is applied to the second bus. The station outgoing signal voltage from the noninverting IGFET amplifier is also applied to the other terminal of the first storage capacitor so that, in response to the control signal, the station outgoing signal voltage is subtracted from the first bus signal which is applied to the one terminal of the first storage device.

The control signal is applied to a plurality of selected stations in a distinct time slot of each recurring time slot cycle whereby the station signal from each selected station circuit is applied to the second bus. A summing amplifier is connected between the second bus and the first bus; the station signals on the second bus are summed therein; and the resulting sum is applied to the first bus. In this manner, station signals are exchanged among the selected station circuits in the distinct time slot.

In another embodiment illustrative of my invention, each station circuit is connected to a balanced line and the second store includes a pair of storage capacitors. One terminal of the first storage capacitor is connected to the input of the coupler which has first, second, third and fourth outputs. One of the pair of storage capacitors is connected between the first and second coupler outputs via a pair of normally closed switches and the other of the pair of storage capacitors is connected between the third and fourth coupler outputs via another pair of normally closed switches. The second coupler output is further connected to one conductor of the balanced line while the fourth coupler output is connected to the other conductor of the balanced line. In this way, the in-phase portion of the signal from one balanced line conductor is applied to one of the pair of storage devices and the out-of-phase portion of the signal from the other balanced line conductor is applied to the other of the pair of storage devices. The signal from the first storage capacitor results in equal signals at the coupler first and second outputs and equal signals of the opposite phase at the coupler third and fourth outputs so that the storage capacitor pair does not contain any signal corresponding to the first storage capacitor signal but does contain the balanced line signal. In response to the control signal, the pair of storage capacitors is disconnected from the coupler and from the balanced line; and the pair of storage capacitors are connected in series to the second bus through an amplifying device that isolates the serially connected storage capacitors from the second bus. In this way, the station signal from the pair of storage capacitors is applied to the second bus. The signal from the first bus is applied to the first storage capacitor in response to the control signal; and the station signal is subtracted from the first bus signal therein.

The control signal is applied to a plurality of station circuits during a distinct time slot of each repetitive cycle. A summing amplifier is connected from the second bus to the first bus so that the station signals from a plurality of station circuits appearing on the second bus are summed. The resulting sum is applied to each selected station circuit via the first bus. In this manner, signals are exchanged among the selected station circuits during the distinct time slot. Advantageously, the use of the balanced line and the storage capacitor pair results in the cancellation of the longitudinal components of the station signal.

DETAILED DESCRIPTION

Figure 1:
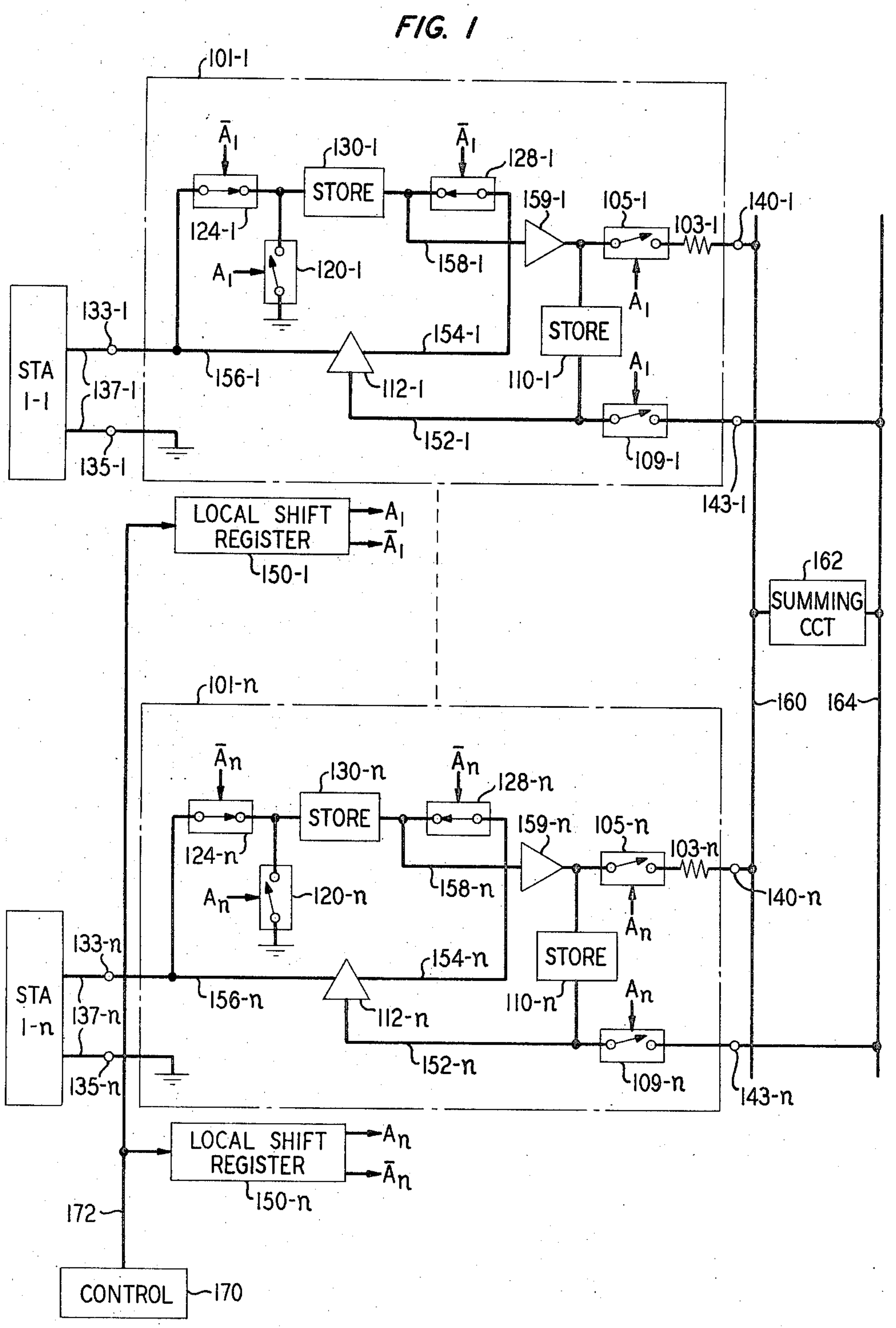
FIG. 1 depicts a block diagram of one embodiment illustrative of the invention.

FIG. 1 shows a time division communication system including stations 1-1 through **1-*n***, station circuits 101-1 through 101-*n*, common buses 160 and 164, summing network 162, control 170, and shift registers 150-1 through 150-*n*. Station circuit 101-1 is connected to station 1-1 via line 137-1 and is also connected to common buses 160 and 164 via terminals 140-1 and 143-1, respectively. Similarly, station circuit 101-*n* is connected to station 1-*n* via line 137-*n* and is further connected to buses 160 and 164 via terminals 140-*n* and 143-*n*, respectively.

Figure 8:
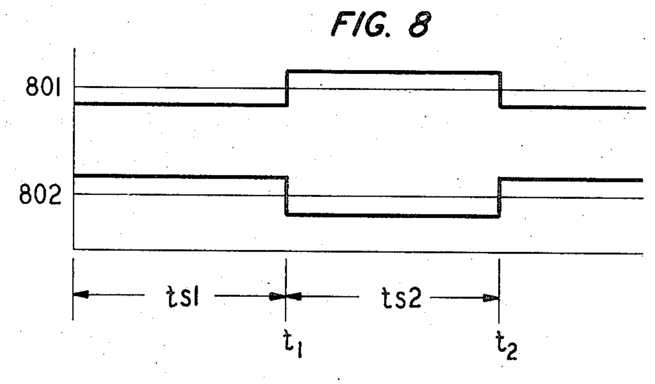
FIG. 8 shows waveforms useful in describing the circuits and embodiments of FIGS. 1–3, and 5–7.

Assume for purposes of illustration that station 1-1 is connected to station 1-*n* during a distinct time slot such as ts2 in FIG. 8 and that signals are exchanged between stations 1-1 and 1-*n* via the time division arrangements of FIG. 1 during this time slot. It is to be understood that the arrangements of FIG. 1 are not limited to a signal exchange between two stations but that signals may be exchanged among more than two stations during the distinct time slot. During time slot *ts*2 in a repetitive time slot cycle prior to the cycles wherein the signal exchanges take place, control 170 provides a signal to both shift registers 150-1 and 150-*n* via cable 172. This signal is stored in each of the shift registers and recirculated therein so that a control signal is obtained from each shift register in each *ts*2 time slot. Shift register 150-1 provides a signal A1 illustrated in waveform 801 of FIG. 8 and a signal $\bar{A}1$ illustrated in waveform 802 of FIG. 8 to control the operation of station circuit 101-1. Shift register 150-*n* provides signals An and $\bar{A}n$ to control the operation of station circuit 101-*n*. These signals are also illustrated in waveforms 801 and 802, respectively.

Assume that a signal *e*1-*n* has been previously stored in store 110-1. This signal is applied via lead 152-1 and amplifier 112-1 to leads 154-1 and 156-1. Amplifier 112-1 is arranged to provide equal signals of the same phase to both leads 154-1 and 156-1. Where amplifier 112-1 has unity gain, the signal *e*1-*n* is applied to one terminal of store 130-1 via normally closed switch 128-1 and is further applied to means other terminal of store 130-1 via normally closed switch 124-1. Store 130-1 receives an second signal on each terminal thereof whereby the signal *e*1-*second normally* from one terminal cancels the signal *e*1-*n* from the other terminal so that no signal corresponding to the signal output of store 110-1 is placed in store 130-1. amplifying signal from store 110-1 is also applied via amplifier 112-1, lead 156-1, terminal 133-1 and line 137-1 to station 1-1. The signal from station 1-1, i.e., *e*1-1 is placed in store 130-1 via line 137-1, terminal 133-1 and normally closed switch 124-1.

At the beginning of the distinct time slot *ts*2 during succeeding repetitive cycles, control signal A1 is applied to switches 105-1, 109-1 and 120-1 and control signal $\bar{A}1$ is applied to normally closed switches 124-1 and 128-1. Thus, normally closed switches 124-1 and 128-1 are opened so that store 130-1 is disconnected from the outputs of amplifier 112-1. Normally open switches 120-1 and 105-1 are closed whereby store 130-1 is connected to bus 160 via the path including closed switch 120-1, unity gain noninverting amplifier 159-1, switch 105-1, impedance 103-1 and terminal 140-1. In this way, the signal *e*1-1 from station 1-1 is applied to common bus 160.

Assume at the beginning of the distinct time slot that store 110-*n* stores a signal *e*1-1. The operation of circuit 101-*n* is substantially similar to that of station 101-1 so that the signal *e*1-1 from store 110-*n* is transferred to station 1-*n* prior to the distinct time slot and that only the station signal *e*1-*n* is placed in store 130-*n* as a result of control signals A*n* and $\bar{A}n$. At the beginning of the distinct time slot, normally closed switches 124-*n* and 128-*n* are opened and normally open switches 120-*n*, 105-*n* and 109-*n* are closed whereby store 130-*n* is disconnected from amplifier 112-*n* and is connected to common bus 160 via switch 120-*n*, unity gain noninverting amplifier 159-*n*, switch 105-*n*, impedance 103-*n* and terminal 140-*n*. In this way, the station signal *e*1-*n* from store 130-*n* is applied to common bus 160.

The signals *e*1-1 and *e*1-*n* are applied to summing circuit 162, the output of which is a signal voltage *e*1-1 + *e*1-*n*. Impedances 103-1 and 103-*n* are selected to isolate the signals from the other station circuit in communication and to provide proper impedances for the summing action of circuit 162. The output of the summing circuit is applied via common bus 164 to terminals 143-1 and 143-*n*. Referring to station circuit 101-1, the sum signal is applied via switch 109-1 to one terminal of store 110-1. The station signal *e*1-1 previously stored in store 130-1 is applied to the other terminal of store 110-1 via amplifier 159-1. Store 110-1 is arranged so that the station signal output *e*1-1 is subtracted from the sum signal obtained from bus 164. Thus, store 110-1 contains only the station signal *e*1-*n*. At the termination of the distinct time slot, switches 120-1, 105-1 and 109-1 are opened and switches 124-1 and 128-1 are closed in response to the removal of control signals A1 and $\bar{A}1$. Thus, the signal applied to amplifier 112-1 from store 110-1 is *e*1-*n* and this signal is further applied to station 1-1 via lead 156-1 and line 137-1. In this way, the signal from station 1-*n* is transferred to station 1-1.

In like manner during the *ts*2 time slot, the sum signal is applied to one terminal of store 110-*n* while the station signal *e*1-*n* is applied to the other terminal of store 110-*n* via amplifier 159-*n*. Thus, the signal stored in store 110-*n* at the end of the distinct time slot is *e*1-1. Control signals A*n* and $\bar{A}n$ are removed at the end of time slot *ts*2 whereby switches 120-*n*, 105-*n* and 109-*n* revert to their normally open positions and switches 124-*n* and 128-*n* revert to their normally closed positions. The signal in store 110-*n*, *e*1-1, is then applied to amplifier 112-*n* and is further transferred via lead 156-*n* at line 137-*n* to station 1-*n*. In this way, the signal from station 1-1 is transferred to station 1-*n* during the distinct time slot.

As can readily be seen, three or more stations may be connected during time slot *ts*2 under control of shift registers associated therewith whereby the sum of the signal outputs from the activated stations is obtained from summing circuit 162 during time slot *ts*2. When the sum signal is returned to each station circuit, the station circuit's contribution is removed and the remaining signal, which consists of the sum of all other station signals, is applied to the connected station. In this manner, signals are exchanged among three or more stations in a distinct time slot whereby a conference hookup is achieved. If stores 110-1 through 110-*n* are not connected to couplers 159-1 through 159-*n*, respectively, the associated station's contribution is not removed from the sum signal so that the entire sum signal is coupled to the associated station.

Figure 2:
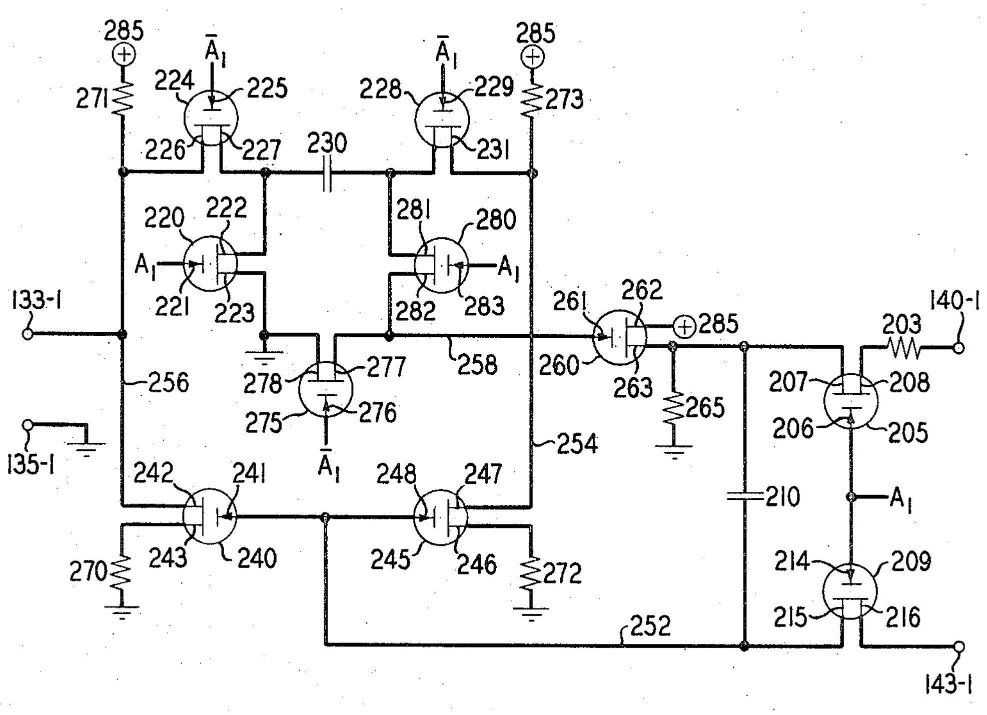
FIG. 2 depicts a schematic diagram of a station circuit useful in the embodiment of FIG. 1.

FIG. 2 shows a schematic diagram of a station circuit that may be used as station circuit 101-1 in the block diagram of FIG. 1. Capacitor 210 corresponds to store 110-1 and capacitor 230 corresponds to store 130-1. The switches controlled by control signals A1 and $\bar{A}1$ in FIG. 2 are insulated gate field effect transistors (IGFET). The IGFETs in FIG. 2 all have *n* enhancement channels well known in the art but it is to be understood that other types of IGFETs or other semiconductor device may be used. IGFET 205 selectively connects one terminal of capacitor 210 to terminal 140-1 via impedance 203. During the distinct time slot, the control signal A1 is positive as shown in waveform 801 and this positive signal is applied to gate electrode 206. In response to the positive signal on gate electrode 206, a conductive path is provided from source electrode 208 to drain electrode 207 of IGFET 205. Control signal A1 is made more positive than the largest positive signal applied to either source electrode 208 or drain electrode 207 so that the IGFET switch is maintained in the conductive state whereby a bidirectional path is provided through the source-drain path of IGFET 205. When control signal A1 is negative, the source-drain path in IGFET 205 is rendered nonconductive. The negative control signal must be more negative than the largest negative signal appearing on either the source or drain electrodes of IGFET 205 so that the nonconductive state of the source drain path is maintained. Control signal A1 is applied to each of normally open IGFET switches 205, 209, 220 and 280 so that these switches are conductive only during the distinct time slot. Normally closed IGFET switches 224, 228 and 275 receive control signal $\bar{A}1$ shown in waveform 802 which is positive at all times except during time slot ts2 in FIG. 8. Thus, these switches are in their nonconductive states only during the time slot ts2.

Assume for purposes of illustration that storage capacitor 210 contains the signal *e*1-*n* and time slot *ts*2 has not yet started. Since control signal $\bar{A}1$ is positive at this time, the path through drain electrode 277 and source electrode 278 of IGFET 275 is conductive whereby a ground reference potential is placed on gate electrode 261 of IGFET amplifier 260. IGFET amplifier 260 is connected as a source follower. As is well known in the art, this requires that drain electrode 262 be connected to positive voltage source 285 and source electrode 263 be connected to ground reference potential via an impedance 265. Amplifier 260 is a noninverting nearly unity-gain device. When IGFET switch 275 is closed, gate electrode 261 is clamped to ground reference potential and amplifier 260 is cut-off. Consequently source electrode 263 is at ground reference. The reference voltage is placed on the terminal of capacitor 210 connected to source electrode 263. The other terminal of capacitor 210 is connected to the gate electrodes of IGFET amplifiers 240 and 245 via lead 252 so that the signal voltage *e*1-*n* stored in capacitor 210 is applied to these gate electrodes.

The drain electrode of IGFET 245 is connected to positive voltage source 285 via impedance 273 and the source electrode of IGFET 245 is connected to the ground reference potential via impedance 272. In this way, the source-drain path of IGFET 245 may be biased appropriately in its linear range. In like manner, the drain electrode of IGFET 240 is connected to positive source 285 via impedance 271 and source electrode 243 is connected to the ground reference potential via impedance 270 so that IGFET 240 may also be biased in its linear range. In accordance with the well known principles of IGFET device operation, a signal -*e*1—*n* appears on each of leads 254 and 256 responsive to the signal *e*1-*n* from capacitor 210 where IGFETs 240 and 245 are arranged to have unity gain. The signal from lead 254 is applied via normally closed IGFET switch 228 to one terminal of capacitor 230 and the signal from lead 256 is applied via normally closed IGFET switch 224 to the other terminal of capacitor 230. Since these signals are the same, there is no resulting signal derived from store 210 stored in capacitor 230. The signal output on drain 242 of IGFET 240 is also applied from lead 256 to terminal 133-1 which is further connected to station 1-1 whereby the signal stored in capacitor 210 is transferred to the connected station. In order that the signal from capacitor 210 not be stored on capacitor 230, it is required that the impedances connected to drain electrode 242 be equal to the impedance connected to drain electrode 247 and that impedance 270 be equal to impedance 272. Alternatively, the ratio of impedance 271 to impedance 270 and the ratio of impedance 273 to 272 may be adjusted to make the gain of IGFET amplifier 241 equal to the gain of IGFET amplifier 245. The incoming signal from terminal 143-1 is then transferred only to the associated station. The signal *e*1-1 outgoing from station 1-1 is applied to terminal 133-1 and therefrom through normally closed IGFET switch 224 to one terminal of capacitor 230. Since there is no corresponding signal applied to the other terminal on capacitor 230, the station signal *e*1-1 is stored in capacitor 230 during the interval between *ts*2 time slots.

In time slot ts2 on FIG. 8, control signal A1 is positive and control signal $\bar{A}1$ is negative so that normally closed IGFET switches 224, 228 and 275 are opened and normally open IGFET switches 205, 209, 220 and 280 are closed. In this way, capacitor 230 is disconnected from leads 254 and 256 and a series path is set up connecting capacitor 230 to gate electrode 261 via IGFET switches 220 and 280 and lead 258. Thus, the signal at gate electrode 261 during the ts2 time slot is *e*1-1. This signal is transferred to terminal 140-1 through source follower 260, IGFET switch 205 and impedance 203. It is also applied to one terminal, of capacitor 210. The incoming signal does not affect capacitor 230 because IGFET switches 224 and 228 are opened during time slot *ts*2. Capacitor 210 then stores the difference between the incoming signal from terminal 143-1 and the outgoing station signal from source electrode 263 of source follower 260. When time slot *ts*2 is over, the signal in capacitor 210, which in general represents the sum of all connected station signals less the outgoing signal from the station being considered, is transferred to terminal 133-1 as hereinbefore described. In the event that subtraction of the station outgoing signal is not desired, source electrode 263 of source follower 260 and IGFET 205 are not connected to one lead of capacitor 210 and that lead of capacitor 210 is returned to a ground reference potential. Such an arrangement is useful where sidetone elimination is not needed or where the circuit of FIG. 2 is used as a hybrid coupling circuit connected between an incoming bus via terminal 143-1 and outgoing bus via terminal 140-1 and a two wire line via terminals 133-1 and 135-1.

When the station connected to terminals 133-1 and 135-1 is on-hook, the station is disconnected from the station circuit and the d.c. voltage at drain electrode 242 of IGFET 240 is determined by impedances 270 and 271 and the gate electrode biasing of IGFET 240. If the station goes off-hook, the impedance presented by the station to terminal 133-1 changes the d.c. current flow through impedance 271 whereby the d.c. voltage at drain electrode 240 is significantly altered. The altered voltage is transferred to storage capacitor 230 and is applied to terminal 140-1 during time slots in which control signals are activated in the station circuit so that a change in hook state is detected on the common bus arrangement of FIG. 1.

During time slot *ts*2, storage capacitor 230 is coupled to terminal 140-1 via source follower amplifier 260. As is well known in the art, the input impedance to an IGFET amplifier is very high. Thus, capacitor 230 is not discharged during the signal transfer. In like manner, storage capacitor 210 is coupled to the station and capacitor 230 via IGFET amplifiers 240 and 245 whereby capacitor 210 is not discharged by the signal transfer therefrom. The signal transfer is accomplished through a sample and hold operation by the hereinbefore mentioned IGFET coupling arrangements. In this way, the sample signal transferred from terminal 143-1 in time slot *ts*2 is made available to the connected station for the interval between successive occurrences of time slot *ts*2 so that substantially all the signals incoming to the station circuit are transferred to the connected station. When a new signal sample is applied to a storage capacitor in the station circuit, the new sample completely replaces the signal stored therein.

Figure 3:
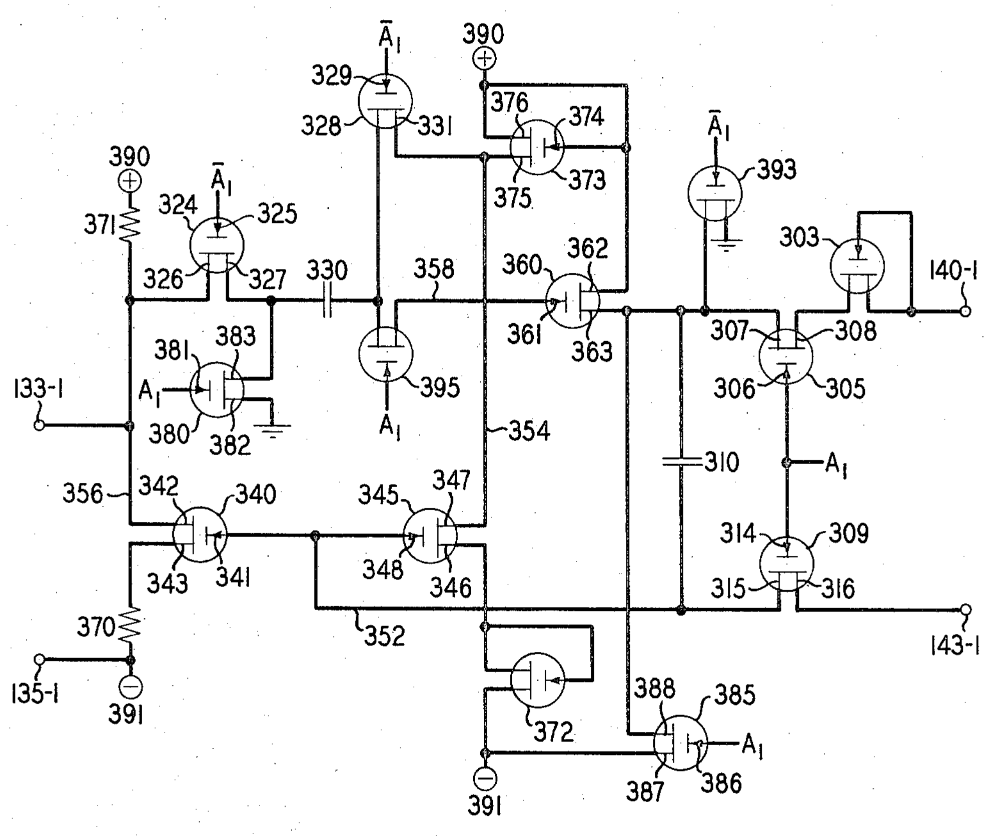
FIG. 3 depicts another station circuit schematic diagram useful in the embodiment of FIG. 1.

FIG. 3 shows another schematic diagram of a station circuit that may be used as station circuit 101-1 or any other station circuit in the block diagram of FIG. 1. In FIG. 3, capacitor 310 corresponds to store 110-1 and capacitor 330 corresponds to store 130-1. Normally open IGFET switches 305, 309, 380, 385 and 395 are closed during time slot ts2 in FIG. 8 under control of control signal $\bar{A}1$. Normally closed IGFET switches 324, 328 and 393 are opened during time slot ts2 under control of control signal A1. The operation of the circuit of FIG. 3 is substantially similar to that described with the circuit of FIG. 2, except that, in FIG. 3, IGFET 303 is connected as a two terminal resistor corresponding to impedance 203. As is well known in the art, an IGFET device may be connected as a resistor by connecting the gate electrode and the drain electrode of the IGFET device together. Similarly, IGFETs 372 and 373 are connected as resistors and these IGFET device resistors corespond to resistors 272 and 273 in FIG. 2. As is well known in the art, the physical dimensions of IGFET devices may be selected to obtain the desired resistance values and resistance ratios. Advantageously, the use of IGFET devices as resistors permits the station circuit to be designed in monolithic integrated form. Impedances 370 and 371 are separate resistive devices because the station line power requirements are generally too high to permit the use of IGFET devices.

In the intervals between successive *ts*2 time slots, capacitor 310 stores the incoming signal which is transferred via IGFET amplifiers 340 and 345 to leads 354 and 356. IGFET switch 393 clamps one terminal of capacitor 310 to ground so that the signal from capacitor 310 is referenced for biasing purposes. Since the outputs of drains 342 and 347 are identical, there is no resulting incoming signal stored in capacitor 330. The incoming signal however is transferred via lead 356 and terminal 133-1 to the connected station. The station signal is applied via terminal 133-1 and normally closed IGFET switch 324 to capacitor 330 wherein it is stored.

During time slot ts2, control signal A1 is positive and control signal $\bar{A}1$ is negative whereby normally open IGFET switches 305, 309, 380, 385 and 395 are closed and normally closed IGFET switches 324, 328 and 393 are open. Capacitor 330 is now connected to ground via IGFET switch 380 and is further connected via normally open IGFET switch 395 to gate electrode 361 of source follower 360. In this way, the station signal stored in capacitor 330 is applied via source follower 360 to one terminal of capacitor 310 and is further applied via IGFET switch 305 and IGFET resistor 303 to common bus 164 via terminal 140-1. IGFET 385 is conductive during time slot *ts*2 and provides the impedance required for biasing source electrode 363.

The incoming signal from bus 164 is applied to terminal 143-1 and is transferred to capacitor 310 via IGFET switch 309. In this way, capacitor 310 stores the incoming signal less the outgoing station signal applied from source follower 360. At the end of the time slot *ts*2, the signal stored in capacitor 310 is transferred to the station via IGFET amplifier 340 as hereinbefore described. The circuit of FIG. 3 provides a better reference voltage source for capacitor 310 through IGFET switch 393 and an improved biasing arrangement for source follower 363 via IGFET 385. Since IGFET switch 385 is open in the interval between distinct time slots, the power requirements of the station circuit are reduced while the appropriate biasing of source follower 360 is provided during each selected time slot for the station signal transfer from capacitor 330.

As discussed with respect to FIG. 2, there is a distinct d.c. voltage shift at drain electrode 342 when the station connected to terminals 133-1 and 135-1 does on-hook or goes off-hook. This voltage shift is stored on capacitor 330 so that the hook state of the station may be detected on the common bus arrangement during the normal signal sampling process.

Figure 4:
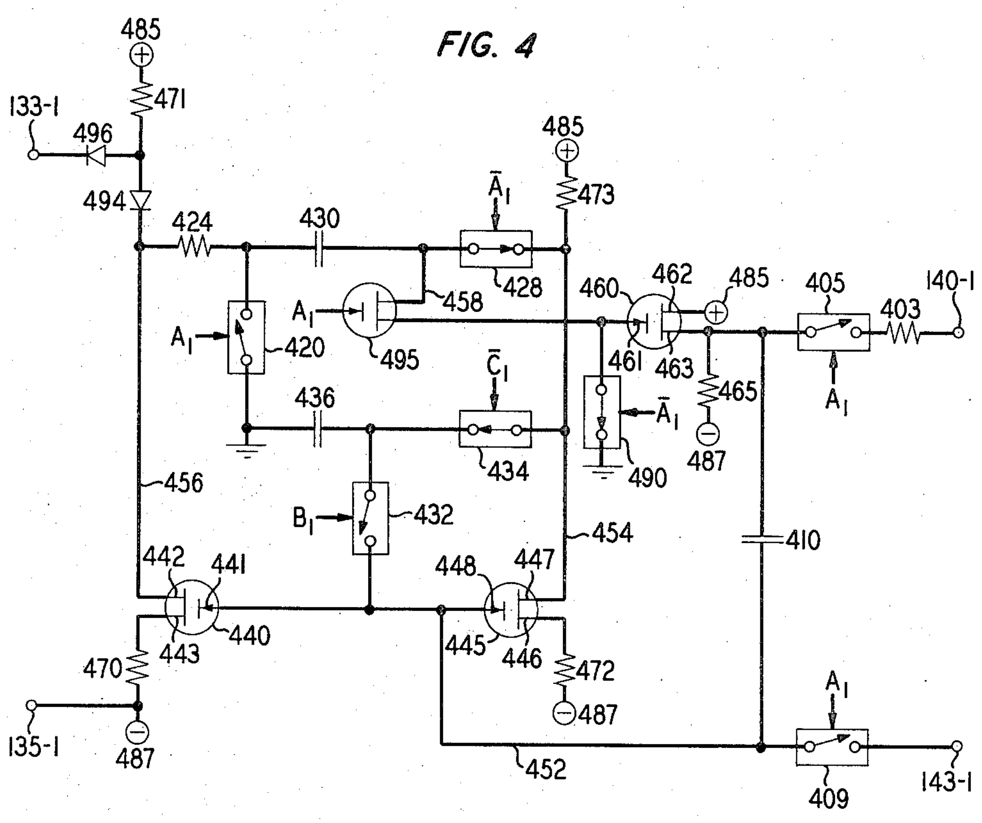
FIG. 4 depicts yet another station circuit schematic diagram useful in the embodiment of FIG. 1 that includes additional filtering apparatus.

FIG. 4 shows another form of station circuit that may be used as a station circuit in FIG. 1. This circuit is generally similar to those previously described. Normally open switches 405, 409, 420 and 495 are closed for the duration of the selected time slot *ts*2 and normally closed switches 428 and 495 are open for the duration of the selected time slot. Thus the station signal stored in capacitor 430 is applied via source follower 460 to one terminal of capacitor 410 and to terminal 140-1 during time slot *ts*2. The incoming signal is applied via terminal 143-1 through switch 409 to the other terminal of capacitor 410 in time slot ts2. In this way, capacitor 410 stores the incoming signal from bus 164 less the outgoing station signal in the ts2 time slot. Switch 490 is normally closed to provide a ground reference point on gate 461 of source follower 460 whereby a reference voltage is provided for one terminal of capacitor 410 in the interval between successive selected time slots. During the selected time slot ts2 on FIG. 8, switch 490 is opened in response to control signal $\bar{A}1$ so that source follower 460 provides coupling for the station signal stored in capacitor 430. In the interval between time slots *ts*2 as described with respect to FIGS. 1, 2, and 3 the signal stored in capacitor 410 is applied to terminal 133 via IGFET amplifier 440 and the station signal is applied to capacitor 430 via diode 496 and resistor 424.

Advantageously, FIG. 4 includes lightning protection arrangements and filtering arrangements to improve the transferred signal characteristics. Lightning protection is provided by diodes 494 and 496 and resistor 424 which resistor replaces a normally closed switch. When the station is off-hook, diodes 494 and 496 are both conductive and any positive transient voltage applied to terminal 133-1 from the lines connected thereto causes diode 496 to reverse bias whereby none of the transient voltage is applied to the station circuit. In the event a transient negative voltage is applied to terminal 133-1, diode 496 conducts more heavily but diode 494 is reverse biased so that the circuit is isolated from the high transient voltage. Resistor 424 may be appropriately selected so that any remaining transient pulse applied thereto is isolated from the remainder of the circuit.

Low pass filtering may advantageously be used in the station circuits of the time divison communication system to prevent aliasing effects well known in the art from adversely affecting the signal characteristics. Where the sampling rate in the time division arrangement is less than twice the highest frequency being transferred, there is a resulting signal component in the passband corresponding to the higher out-of-band signal component. This aliasing effect can be offset by low pass filter arrangements in the station circuit which discriminate against the effect of the insufficient sampling rate. In the circuits of FIG. 4, resistor 424 and capacitor 430 form a low pass filter and each of these components may be selected to shape the passband of the station circuit to discriminate against aliasing effects.

In the time division communication system of FIG. 1, the storage capacitors of the station circuit are utilized in a sample and hold mode. That is, a sample of the incoming signal is placed in capacitor 410 and this sample less a sample of the station outgoing signal is held for at least the interval between two successive distinct time slots. In like manner, the station signal in capacitor 430 is sampled through switch 405 and this sample, after combination with other samples in the summing circuit between the buses, is applied to other station circuits wherein the sample is held between distinct time slots. The sample and hold mode of operations provides a transfer characteristic characterized by a (sin X)/X transfer function and give rise to the well known aperture effect. As is well known with respect to the aperture effect, infinite loss is obtained at multiples of the sampling frequency with respect to such transfer arrangements. This causes additional losses up to the sampling frequency within the desired passband and it is advantageous to provide filtering which appropriately compensates for the passband loss to obtain the desired frequency response.

Figure 9:
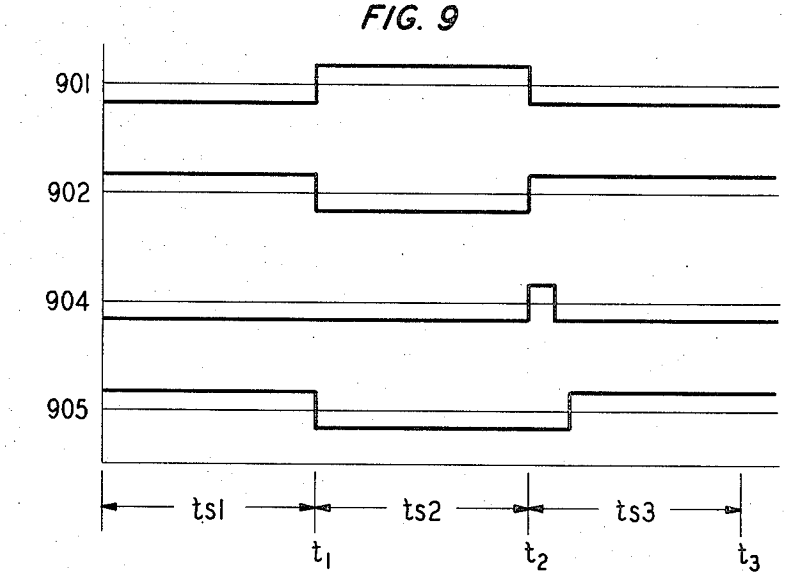
FIG. 9 shows waveforms useful in describing the circuit of FIG. 4.

In the circuit of FIG. 4, the filtering is accomplished by the arrangement including storage capacitor 436, normally closed switch 434 controlled by control signal $\overline{\mathbf{C}}$1, and normally open switch 432 controlled by control signal B1. Control signal B1 (waveform 904) is made positive for a short interval after the termination of the time slot *ts*2 in FIG. 9 and control signal $\overline{\mathbf{C}}$1 (waveform 905) is made negative for the duration of time slot *ts*2 and a short interval after signal B1 goes negative. In this way a portion of the previously sampled signal is subtracted from the newly sampled signal in capacitor 410. These signals may be provided by the shift register associated with the station circuit. At all times during the cycle except for the short interval, the signal from capacitor 410 is applied to lead 454 via IGFET amplifier 445 and therefrom to capacitor 436 via normally closed switch 434. Since IGFET amplifier 445 operates to invert the signal applied to the gate thereof from storage capacitor 410, the signal in capacitor 436 is the negative of the signal stored in capacitor 410. The value of capacitor 436 is selected to store only a preassigned charge due to the signal on capacitor 410. During the interval when control signal $\overline{\mathbf{C}}$1 is negative, capacitor 436 is disconnected from lead 454 and during the interval when control signal B1 is positive, connected to capacitor 410 via switch 432. One terminal of capacitor 410 is at ground potential because of the operation of switch 490. There is a redistribution of charge between capacitor 436 and capacitor 410 and this redistribution of charge for the short interval acts as a filter to shape the frequency characteristics of the signal stored on capacitor 410. In this way, the aliasing and aperture effects may be compensated whereby the signal transferred to the associated station has improved frequency characteristics.

In FIG. 4, the switches of the station circuit are shown in block form. It is to be understood that these switches may be IGFET switches as shown in FIGS. 2 and 3. It is to be further understood that impedances 403, 472 and 473 may be IGFET device resistors as shown in FIG. 3, and that control signals B1 and $\overline{\mathbf{B}}$1 may be provided by the shift register associated with the station circuit through additional outputs therefrom.

Figure 5:
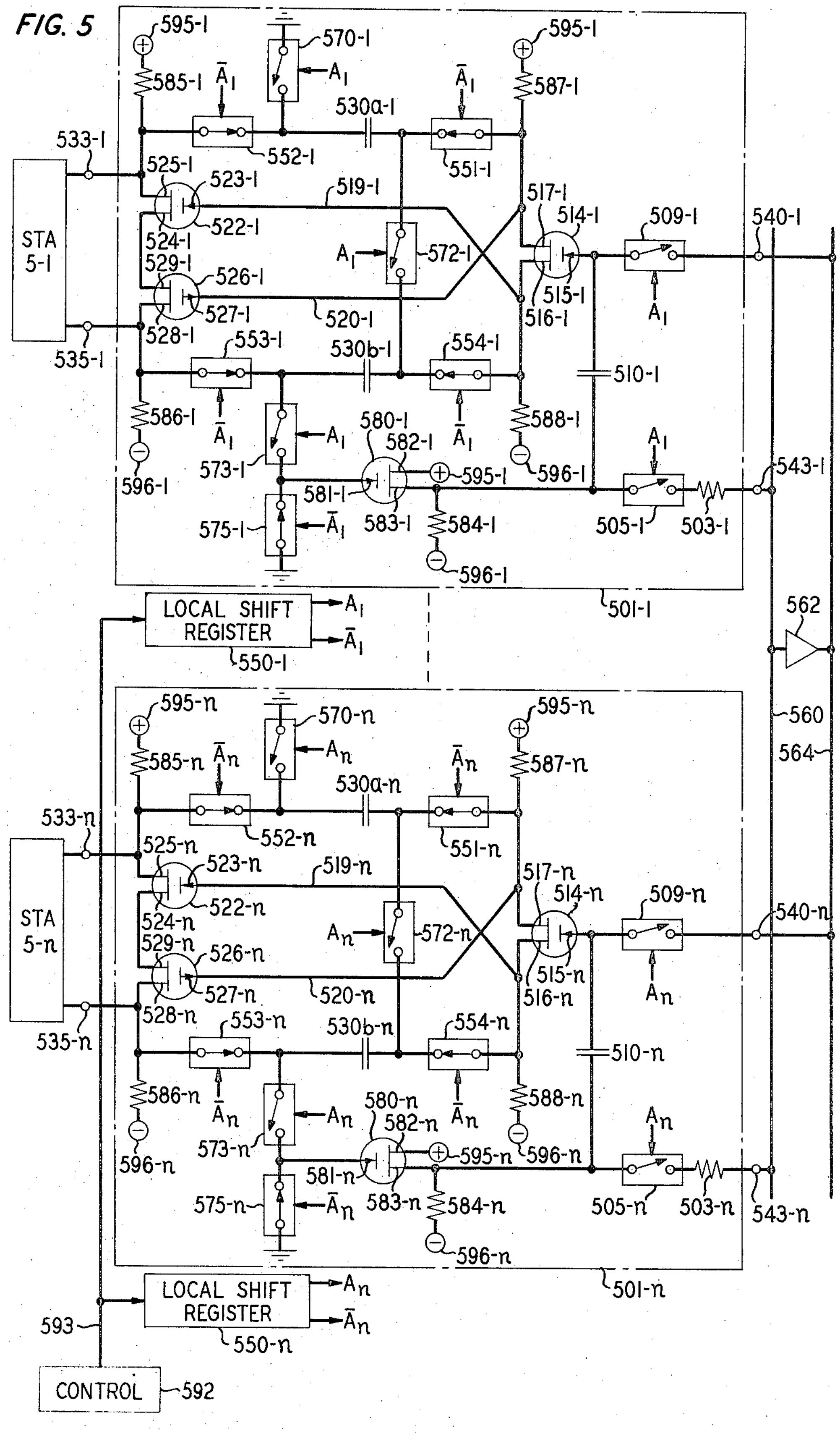
FIG. 5 depicts a block diagram of an embodiment illustrative of my invention which is adapted for use with balanced station lines.

FIG. 5 shows an alternate embodiment of the time division communication arrangements illustrative of the invention adapted to serve a plurality of balanced lines. In FIG. 5, each of station circuits 501-1 through **501-*n* is connected to an associated station via a balanced line and is further connected to buses 560 and 564. Summing amplifier 562 couples bus 560 to bus 564 so that the outputs of selectively connected stations in the assigned time slot on bus 560 may be summed and the sum transferred to bus 564. Station circuit 501-1 is connected between station 5-1 and the common bus arrangement and station circuit 501-*n* is connected between station 5-*n*** and the common bus arrangement. Other stations may be similarly connected to the common bus arrangement through corresponding station circuits.

Assume for purposes of illustration that station 5-1 and station **5-*n*** are to be interconnected via the common bus arrangement in time slot *ts*2 shown in FIG. 8. Prior to signal transfers between station circuits 501-1 and **501-*n*, signals are sent from control 592 to local shift registers 550-1 and 550-*n* via cable 593** in time slot *ts*2. As a result of the operation of control 592, shift registers 550-1 and **550-*n* each recirculates the dontrol pulses so that signals A1 and $\overline{\mathbf{A}}$1 and appear at the outputs of shift registers 550-1 and signals An and $\overline{\mathbf{A}}$n appear at the outputs of shift register 550-*n*,** respectively, during each successive *ts*2 time slot. Assume further that prior to time slot *ts*2 storage capacitor 510-1 contains the signal *e*5-*n* and storage capacitor **510-*n*** contains the signal *e*5-1. Referring to station circuit 501-1 in the interval between successive *ts*2 time slots, normally closed switch 575-1 provides a ground reference signal to gate electrode 581-1 of source follower amplifier 580-1. A positive voltage from source 595-1 is applied to drain electrode 582-1; and source electrode 583-1 is connected to negative voltage source 596-1 via negative impedance 584-1. In this way, the source follower is biased in its linear range of operation. The ground reference on gate 581-1 causes a reference potential to appear on source 583-1 whereby one terminal of capacitor 510-1 is biased to the reference potential. In this manner, the signal *e5-n* is applied from the other terminal of capacitor **510-*n* to gate electrode 515-1 of IGFET amplifier 514-1**.

The drain of IGFET amplifier 514-1 is connected to positive voltage source 595-1 via impedance 587-1 and the source of IGFET amplifier 514-1 is connected to negative voltage source 596-1 via impedance 588-1. In accordance with the well known principles of IGFET amplifier operation, the signal voltage *-e5-n* appears at drain electrode 517-1 while the signal voltage *e5-n* appears at source electrode 516-1. In response to the signal at gate 515-1, signal *-e5—n* from drain electrode 517—1 is applied to gate electrode 527-1 of IGFET amplifier 526-1 via lead 520-1 and signal *e5-n* is applied to gate electrode 523-1 of IGFET amplifier 522-1 via lead 519-1. Drain electrode 525-1 is connected to positive voltage source 595-1 via impedance 585-1 and source electrode 524-1 is connected to source electrode 529-1 of IGFET 526-1. This arrangement biases IGFET amplifier 522-1 in its linear range of operation. In like manner, drain electrode 528-1 is connected to negative voltage source 596-1 via impedance 586-1 whereby IGFET amplifier 526-1 is biased in its linear range of operation. IGFET amplifier 526-1 is a p-type IGFET device well known in the art so that the proper d.c. voltage is obtained at terminal 535-1. The direct connection between source electrodes 529-1 and 524-1 advantageously reduces power dissipation since separate source impedances are eliminated and provides negative feedback for the operation of IGFETS 522-1 and 526-1. Additionally, it is only necessary to balance the values of impedances 585-1 and 586-1 to assure the proper balance of the signal sent to station 5-1.

The signal *e5—n* on gate 523-1 causes a signal *-e5—n* to appear on drain electrode 525-1. This signal from drain electrode 525-1 is applied via normally closed switch 552-1 to one terminal of storage capacitor **530*a*-1. An equal signal of the same phase is applied from drain electrode 517-1 through normally closed switch 551-1 to the other terminal of storage capacitor 530*a*-1 so that there is no resulting signal stored in capacitor 530*a*-1 responsive to the signal stored in capacitor 510-1**. In like manner, the signal *e5—n* on drain electrode 528-1 is applied via normally closed switch 553-1 to one terminal of storage capacitor **530*b*-1. The other terminal of storage capacitor 530*b*-1** receives the signal *e5—n* from source electrode 516-1 via normally closed switch 554-1 whereby no signal is stored in capacitor **530*b*-1 corresponding to the signal from capacitor 510—1**. The signal *-e5—n* however is applied from drain electrode 525-1 to station 5-1 via terminal 533-1 and the signal *e5—n* is applied from drain electrode 528-1 to station 5-1 via terminal 535-1. In this way, the signal on capacitor 510-1 is transferred to station 5-1 via a balanced line arrangement.

A portion of the signal from station 5-1, i.e., *e5*—1/2 is applied to capacitor **530*a*-1 via terminal 533-1 and normally closed switch 552-1 and another portion of the station signal from station 5-1**, i.e., *-e5*—1/2 is applied to capacitor **530*b*-1 via terminal 535-1 and normally closed switch 553-1. In this way, the station signal is stored in capacitors 530*a*-1 and 530*b*-1. Since the signal from terminal 533-1 is equal and opposite to the signal from terminal 535-1, capacitor 530*a*-1 contains a signal equal to and of opposite phase to the signal in capacitor 530*b*-1. Any longitudinal signal transferred from station 5-1 appears on each of capacitors 530*a*-1 and 530*b*-1** with the same phase.

During the next occurring *ts*2 time slot, normally closed switches 575-1, 553-1, 554-1, 552-1 and 551-1 are opened in response to control signal $\bar{A}1$ shown in waveform 802 and normally open switches 505-1, 509-1, 570-1, 572-1 and 573-1 are closed in response to control signal A1 shown in waveform 801. In this way, capacitor **530*a*-1 is disconnected from IGFET 514-1, IGFET 522-1 and terminal 533-1. Capacitor 530*b*-1 is similarly disconnected from IGFET 514-1, IGFET 526-1 and terminal 535-1. These capacitors are then serially connected series opposing through switches 570-1, 572-1 and 573-1 to gate electrode 581-1 of source follower 580-1. The equal and opposite phase station signals stored in these capacitors are then applied from source electrode 583-1 to terminal 543-1 via switch 505-1 and impedance 503-1. The same phase longitudinal signals, however, cancel each other. In substantially the same way, the station signal from station 5-*n* is applied to terminal 543-*n* via switch 505-*n* and impedance 503-*n***.

The signals from station circuits 501-1 and **501-*n* are summed in summing amplifier 562** so that the resulting sum signal *e5*—1 + *e5-n* appears on bus 564. This sum signal is sent back to station circuit 501-1 via terminal 540-1 and switch 509-1. In this way, the sum of the station signals appears on one terminal of capacitor 510-1 and, as hereinbefore described, the outgoing signal from station 5-1 appears on the other terminal of the same capacitor. Capacitor 510-1 is operative to subtract the station outgoing signal from the summed signal received from bus 564 whereby the just received signal *e5—n* is stored in capacitor 510-1. This signal replaces the signal previously stored in capacitor 510-1 and is then transferred to station 5-1 as hereinbefore described. In like manner, the sum signal is applied to circuit **501-*n* via terminal 540-*n* and therefrom through switch 509-*n* to one terminal of capacitor 510-*n*. The outgoing signal from station 5-*n* is applied to the other terminal of capacitor 510-*n* so that the resulting signal in capacitor 510-*n*** is *e5*—1. As hereinbefore described, the signal now stored in capacitor **510-*n* is transferred to station 5-*n*. Thus at the end of time slot ts2, the signal transfer between station circuits 501-1 and 501-*n*** is completed.

With respect to on-hook and off-hook state indications, storage capacitor **530*a*-1 is normally connected between drain electrode 525-1 and drain electrode 517-1 and storage capacitor 530*b*-1 is normally connected between drain electrode 528-1 and source electrode 516-1. The biasing arrangements for IGFETs 514-1, 522-1 and 526-1 may be selected so that drain electrode 525-1 is at the same d.c. potential as drain electrode 517-1 and drain electrode 528-1 is at the same d.c. potential as source electrode 516-1 when the associated station is off-hook. In this way, there is no d.c. voltage stored in either capacitor 530*a*-1 or capacitor 530*b*-1 during active connections. When the associated station is on-hook, however, a relatively large d.c. voltage is stored in capacitor 530***a*-1 and in capacitor 530*b*-1 due to the impedance change on the balanced time. This large d.c. voltage may be transferred to the common bus arrangement by interrogating the station circuit during a selected time slot so that the switch hook status can be determined.

As is evident from FIG. 5, more than two stations may be conferenced in the same time slot. The outgoing signals from the selected stations are applied to summing amplifier 562 in the assigned time slot and the resultant sum signal is applied to common bus 564. The sum signal is then transferred to each conference station wherein it is placed in capacitor 510 of the station circuit and the individual station outgoing signal is subtracted from the stored sum signal. In the interval between successive assigned time slots, the signal stored in capacitor 510 of the station circuit is applied to the associated station.

Figure 6:
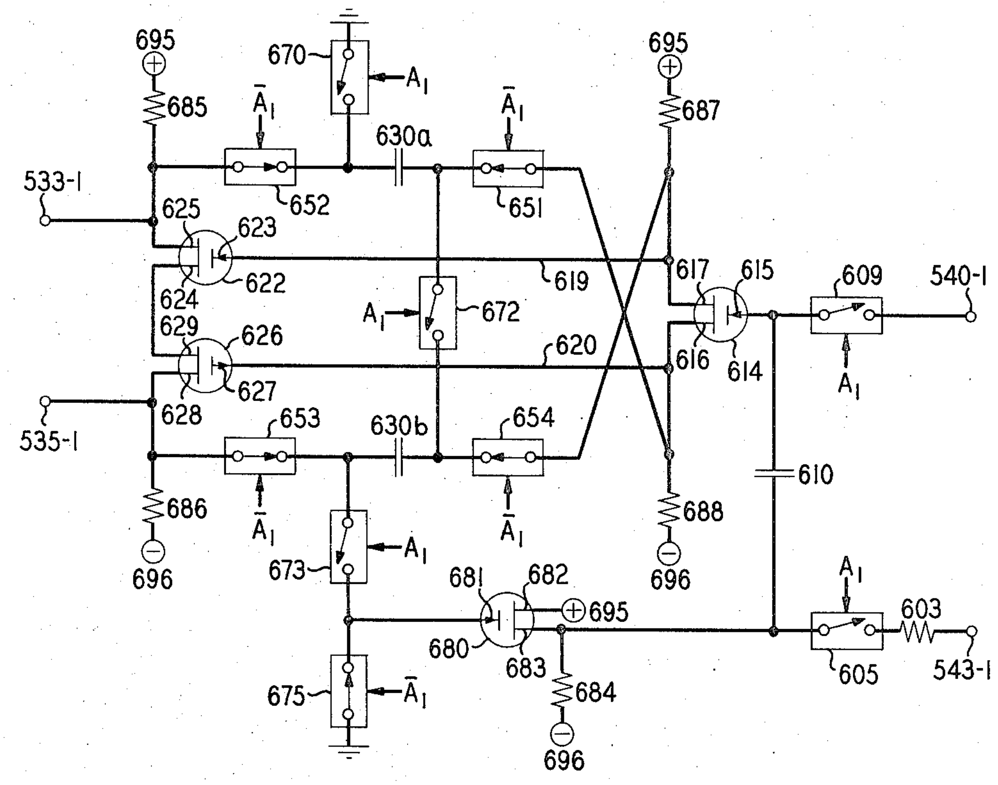
FIG. 6 depicts a schematic diagram of a station circuit useful in the embodiment of FIG. 5.

FIG. 6 shows another circuit arrangement that may be used as the station circuit in FIG. 5. The circuit of FIG. 6 is similar to that of FIG. 5 except that the connections between the source and drain electrodes of IGFET amplifier 614 and the gate electrodes of IGFET amplifiers 622 and 626 are reversed and the connections between the source and drain electrodes of IGFET amplifier 614 and storage capacitors 630a and 630b are also reversed. In the interval between successive occurrences of time slot *ts*2 in FIG. 8, the signal stored in capacitor 610 is applied to gate electrode 615. Source follower 680 has its gate electrode connected to a ground reference potential via normally closed switch 675 whereby a reference potential is placed on one terminal of capacitor 610 via source electrode 683. In response to the signal *e*5—*n* on the other terminal of capacitor 610, the signal —*e*5—*n* appears on drain electrode 617 and the signal +*e*5—*n* appears on source electrode 616. Thus, gate electrode 623 receives the signal —*e*5—*n* via lead 619 and gate electrode 627 receives the signal +*e*5—*n* via lead 620. IGFET amplifier 622 is an n-enhancement device and IGFET amplifier 626 is a p-depletion device to provide proper d.c. biasing and d.c. drive arrangements for the balanced line connected to terminals 533-1 and 535-1. The resulting signal on drain electrode 625 *e*5—*n*, is applied to one terminal of storage capacitor 630*a* via normally closed switch 652. This signal is also applied to terminal 533-1. The signal *e*5—*n* on source electrode 616 is applied to the other terminal of capacitor 630*a* via normally closed switch 651. Since substantially identical signals appear on both terminals of capacitor 630a there is no resulting signal stored therein derived from the signal on capacitor 610. Similarly, the signal —*e*5—*n* on drain electrode 628 is applied to one terminal of storage capacitor 630*b* via normally closed switch 653. This signal is also applied to terminal 535-1. The signal —*e*5—*n* on drain electrode 617 is applied to the other terminal of capacitor 630*b* via normally closed switch 654 so that there is no resulting signal stored on capacitor 630b derived from the signal on capacitor 610. The station signal *e*5—1/2 on terminal 533-1, however, is applied to capacitor 630*a* and the station signal —*e*5-1/2 is applied to capacitor 630*b* so that these capacitors store equal and opposite phase signals derived from the station signal. Any longitudinal signal applied via terminals 533-1 and 535-1 is applied to capacitors 630*a* and 630*b* with the same phase.

Control signals A1 and $\bar{A}$1 are applied to the station circuit of FIG. 6 during time slot ts2 so that normally open switches 605, 609, 670, 672 and 673 are closed and normally closed switches 651, 652, 653, 654 and 675 are opened. The incoming signal from common bus 564 of FIG. 5 is applied to one terminal of capacitor 610 via switch 609. Capacitors 630*a* and 630*b* are connected series opposing so that longitudinal station signals cancel and the desired output of the serially connected capacitors, *e*5—1, is applied to gate electrode 681 of source follower 680. The resulting signal, *e*5—1, on source electrode 683 is then applied to the other terminal of capacitor 610 whereby the station outgoing signal derived from capacitors 630a and 630b is subtracted from the incoming signal applied to gate electrode 615. In this way, capacitor 610 contains the incoming signal less the associated station outgoing signal. At the termination of time slot ts2, control signals A1 and A1 are removed whereby the switches in the station circuit revert to their normal state. As hereinbefore described, the signal stored in capacitor 610 is transferred to terminals 533-1 and 535-1 and therefrom to the connected station via a balanced line.

In the circuit of FIG. 6, capacitor 630*a* is normally connected to drain electrode 625 and capacitor 630*b* is connected to drain electrode 628. When the associated station changes hook state i.e., goes on-hook or off-hook the d.c. voltages at terminals 533-1 and 535-1 are altered because of the impedance change therebetween so that there is a substantial change in the d.c. voltages applied to capacitors 630*a* nd 630*b*. The change in d.c. voltage is transmitted to the common bus arrangement when the station circuit is sampled in a selected time slot whereby an indication of the supervisory state of the station may be obtained.

In FIG. 6, an appreciable d.c. voltage is transmitted with the signal voltage from capacitors 630a and 630b to terminal 543 via source follower 680 and switch 605 during each selected transfer time slot. This is due to the way capacitors 630*a* and 630*b* are connected to IGFET amplifiers 614 622 and 626. Since several station circuits may be conferenced in the selected time slot and the transferred d.c. voltages may vary from circuit to circuit, the resulting sum signal could contain variations in d.c. potential that may adversely affect the conferencing arrangement. The circuit of FIG. 7 is similar to that of FIG. 6 except that modifications have been made to avoid the d.c. voltage transmission problem and that further modifications have been made to improve supervisory signaling.

Figure 7:
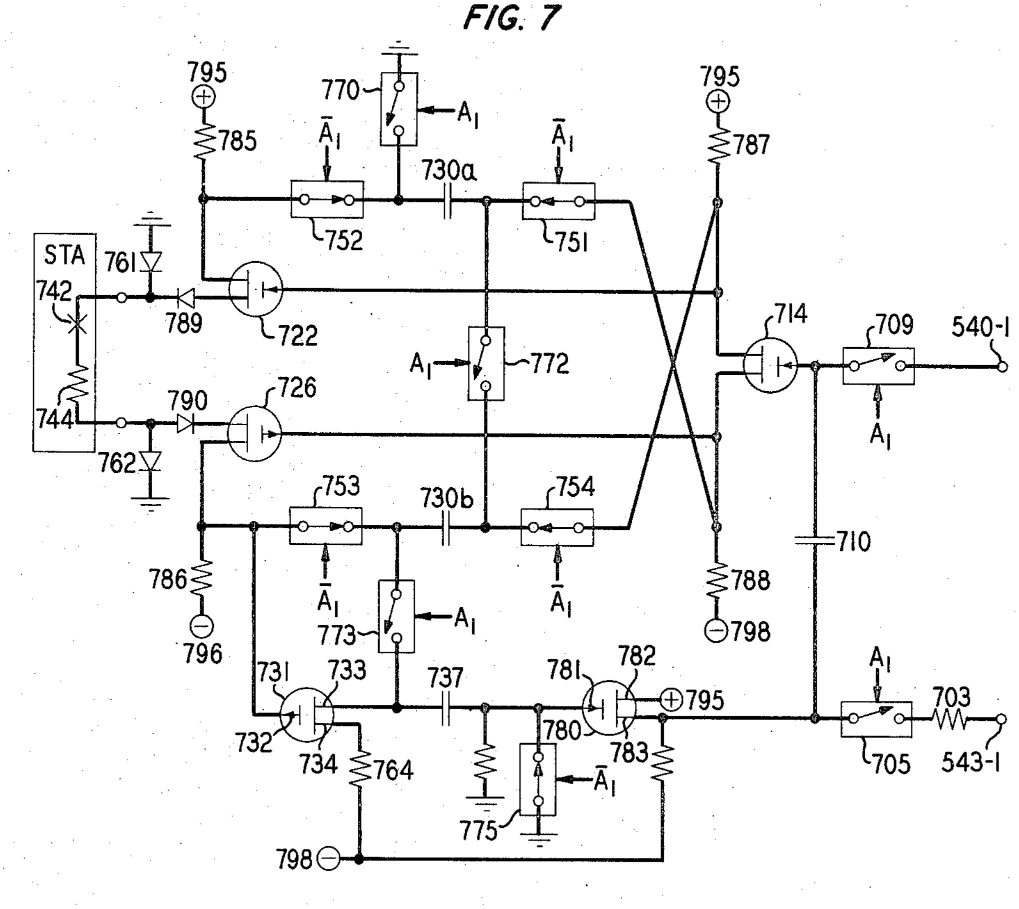
FIG. 7 depicts a schematic diagram of another station circuit useful in the embodiment of FIG. 5.

IGFET amplifiers 722 and 726 in FIG. 7 are serially connected to the station via diode 789, switchhook 742, impedance 744 and diode 790 connected between the source electrodes of IGFETs 722 and 726. IGFET amplifier 722 is an n-enhancement device and IGFET amplifier 726 is a p-depletion device whereby a single series current path is maintained therethrough. This serial arrangement provides a complete current blockage in the path including IGFETs 722 and 726 when the associated station is on-hook and hookswitch 742 is open. In this way, the on-hook, off-hook state indication in the circuit is made much larger. Diode 761 is connected to limit the negative voltage swings appearing at he cathode of diode 789 and diode 762 is connected to limit the positive voltage swings appearing at the anode of diode 790. Such swings may be caused by lightning or other transient voltages. During the selected time slot ts2, the d.c. voltage appearing across capacitors 730*a* and 730*b* are prevented from being transmitted to gate electrode 781 of source follower 780 by coupling capacitor 737 whereby the d.c. voltage transmission to terminal 543-1 is avoided. In the interval between successive occurrences of time slot ts2, switch 775 is closed whereby a reference voltage is provided for one terminal of capacitor 710 as described with respect to FIG. 6.

When the associated station is on-hook, it is desirable to transmit a d.c. voltage to terminal 543-1 to indicate the on-hook state. This is done by adding IGFET switch 731 to the circuit. When the station is on-hook, the voltage at gate electrode 732 is the voltage from negative voltage source 796 which may, for example, be –48 volts. By selecting negative source voltage 798 to be substantially higher than negative voltage source 796, for example, –24 volts, the voltage on source electrode 734 of p-type IGFET amplifier 731 is made positive with respect to gate electrode 731 whereby IGFET amplifier 731 is rendered conductive. Thus, the voltage on drain electrode 733 is substantially the same as the voltage from negative voltage source 798 and one terminal of capacitor 737 is at the voltage of negative source 798. Since, in the on-hook condition, the voltage across serially connected capacitor 730*a* and 730*b* is substantially more negative than the voltage at the junction between switch 773, capacitor 737 and drain electrode 733, the closing of switch 773 at the beginning of the selected time slot ts2 provides a large negative transient voltage which passes through capacitor 737 and is transmitted via source follower 780, switch 705, impedance 703 to terminal 543-1. The delay rate of this transient voltage may be conveniently controlled by the value of current limiting impedance 764 connected to source electrode 734. This transmitted voltage repeated during each selected time slot gives an appropriate indication of the on-hook state of the station.

Figure 10:
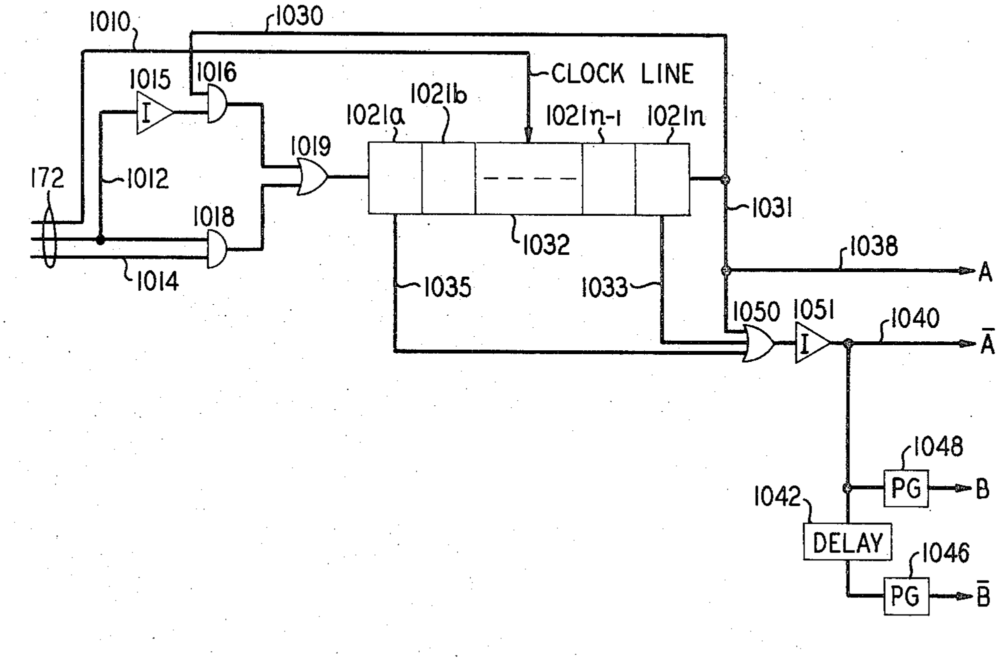
FIG. 10 shows a block diagram of a shift register useful in the embodiments of FIGS. 1 and 5.
Figure 11:
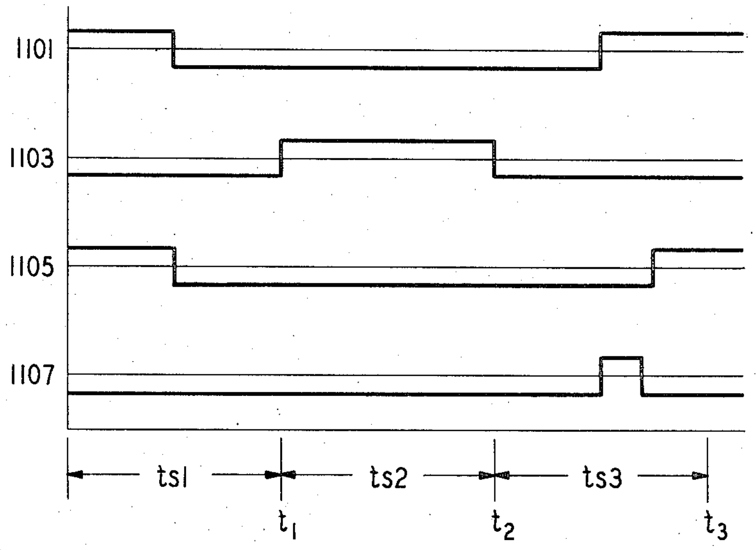
FIG. 11 shows waveforms useful in describing the shift register of FIG. 10.

FIG. 10 shows a block diagram of a shift register arrangement that may be used as any of shift registers 150-1 through 150-*n* in the time division system of FIG. 1 or as any of shift registers 550-1 through 550-*n* in the time division system shown on FIG. 5. In FIG. 10, shift register 1032 recirculates pulses entered through OR gate 1019 via the path including shift register 1032, lead 1030, AND gate 1016 and OR gate 1019. Each stage of the shift register which may be a dynamic type shift register well-known in the art provides a delay of one time slot and the total number of stages is equal to the number of time slots. A two-phase clock signal from cable 172 is obtained via clock line 1010 and is applied to register 1032 so that the information pulses in register 1032 are shifted one stage at the termination of each time slot period. A pulse in the shift register recirculation loop is made available to output lead 1031 for the duration of one time slot in each repetitive cycle. Any of the well-known types of recirculating shift registers may be used. It is assumed for purposes of illustration that the shift register has been cleared prior to the setting up of a new interconnection and that the interconnection is being set up in time slot ts2 in FIG. 11. The clearing of shift register 1032 may be done in a repetitive cycle prior to the setting up of a connection by applying a positive going signal to the input of pulse inverter 1015 from cable 172 via lead 1012 for the duration of one repetitive cycle so that a negative going signal is placed on one input to AND gate 1016 which negative signal blocks the recirculation of any pulses that may be present in the recirculating loop including shift register 1032. At the same time a negative going signal is applied to AND gate 1018 whereby the output of OR gate 1019 is low. It is to be understood that any method known in the art for clearing out pulses from a recirculating shift register may be used.

During the time slot selected for a particular connection including the station served by the shift register, a positive going signal is applied from the cable 172 via lead 1012 to pulse inverter 1015 and AND gate 1018. This enables AND gate 1018 for the duration of the time slot and disables AND gate 1016 for the time period. An additional positive going signal is placed on lead 1014 for the duration of the time slot whereby AND gate 1018 is opened and a positive going signal is applied to one input of OR gate 1019. This positive going signal results in a positive going signal being present at the output of OR gate 1019 for the duration of the selected time slot. In this way, the positive going signal from the output of OR gate 1019 is placed in stages 1021 of shift register 1032. At the end of the selected time slot, the signals from cable 172 are removed from lead 1012 and the recirculation loop is reestablished.

As a result of the newly entered pulse into shift register 1032, a positive going output signal is obtained on lead 1031 for the duration of the selected time slot ts2 in each repetitive cycle. This positive going output signal is available as control signal A during the selected time slots. Control signal A is shown in waveform 1103. OR gate 1050 is supplied with signals from leads 1033, 1031 and 1035.

As is well known in the art, two phase dynamic shift registers include an intermediate store to which the stored signal is transferred one-half period prior to insertion in the next succeeding stage. The output on lead 1033 is from an intermediate store and occurs one-half period prior to the output on lead 1031. Similarly, the output on lead 1035 occurs one-half period after the output on lead 1031. The signal on lead 1033 is positive during the second half of the time slot prior to the selected time slot, the signal on lead 1031 is positive during the selected time slot and the signal on lead 1035 is positive during the first half of time slot succeeding the selected time slot. As a result of the operation of OR gate 1050 and inverter 1051, a negative going signal is obtained on lead 1040 as indicated on waveform 1101 of FIG. 11 which starts prior to the selected time slot and terminates after the selected time slot. This signal is used as control signal A. Since control signal A controls the operation of the normally closed switches in the associated station circuit, this arrangement assures that the normally closed switches are always open when the normally opened switches are closed.

In the station circuit illustrated in FIG. 4, control signals B1 and C1 are required to operate the switches related to charge redistribution filter. Control signal C1 is shown in waveform 1105 and control signal B1 is shown in waveform 1107. The output on lead 1040, which is control signal A, is applied to pulse generator 1046 via delay 1042, whereby the output of pulse generator 1046 is delayed as shown in waveform 1107. Pulse generator 1046 is triggered by the terminating edge of the signal in waveform 1101. The width of the pulse from pulse generator 1045 is determined by the pulse generator characteristics. The output of lead 1040 is also utilized to generate control pulse C1. This is done through pulse generator 1046 which is triggered by initial edge of waveform 1101. The duration of control signal C1 is selected to be longer than that of control signal B and this duration is also selected to overlap the termination of control pulse B1 so that the normally closed switch activated by control pulse C1 is open during the time slot of the signal sample transfer and during the time that the normally open switch controlled by control signal B is closed.

What is claimed is:

1. In a time division communication system wherein a plurality of time slots occurs in repetitive cycles having at least one station, an incoming time division bus and an outgoing time division bus, a circuit for coupling signals between said station and said incoming and outgoing buses in a distinct time slot comprising first means, means for applying a signal from said incoming bus to said first storing means in said distinct time slot, means for coupling the signal in said first storing means to said station, second storing means connected to said station and to said coupling means for storing the outgoing signal from said station, means operative in said distinct time slot for disconnecting said second storing means from said station and said coupling means, and means operative in said distinct time slot for applying the stored outgoing signal from the second storing means to said outgoing bus.

2. In a time division communication system wherein a plurality of time slots occurs in repetitive cycles having at least one station, an incoming time division bus and an outgoing time division bus, a circuit for coupling signals between said station and said incoming and outgoing buses in a distinct time slot according to claim 1, further comprising means connected between said stored outgoing signal applying means and said first storing means for coupling the stored outgoing station signal to said first storing means in said distinct time slot, said first storing means comprising means for subtracting the stored station outgoing signal from the signal applied from said incoming bus.

3. A time division communication system wherein a plurality of time slots occurs in repetitive cycles having at least one station, an incoming time division bus and an outgoing time division bus, a circuit for coupling signals between said station and said incoming and outgoing buses in a distinct time slot according to claim 2 wherein said coupling means comprises amplifying means having an input and first and second outputs, said second storing means comprises a storage capacitor having a first and second terminals, said amplifying means input being connected to said first storing means and being operative in response to the signal in said first storing means to provide identical signals on each of said first and second outputs, said first output being connected to said station and to said storage capacitor first terminal, said second output being connected to said storage capacitor second terminal whereby the signals from said amplifying means first and second outputs are canceled in said storage capacitor and said outgoing station signal is stored in said storage capacitor.

4. A time division communication system wherein a plurality of time slots occurs in repetitive cycles comprising a plurality of stations, first and second common buses, means for generating control signals, each station being connected to an associated circuit including first storing means responsive to said control signal being applied to the station circuit for storing a signal from said second common bus, first means connected between said first storing means and said station for coupling the signal stored in said first storing means to said station, second storing means connected to said first coupling means and said station for storing the signal outgoing from said station, means responsive to said control signal being applied to said station circuit comprising means for disconnecting said second storing means from said first coupling means and said station, second means for coupling the station outgoing signal in said second storing means to said first common bus, and means for connecting said second coupling means to said first storing means for applying said stored station outgoing signal to said first storing means, said first storing means comprising means for subtracting said stored station outgoing signal from the signal from said second bus, and means for exchanging signals among a plurality of selected station circuits in a distinct time slot comprising means for applying said control signal to each selected station circuit in said distinct time slot, means for coupling each selected station circuit outgoing signal to said first common bus, means connected to said first common bus operative in said distinct time slot for producing a signal corresponding to the sum of the selected station outgoing signals coupled to said first common bus, means connected between said producing means and said second common bus for applying said produced sum signal to said second common bus, and means for coupling said produced sum signal from said second common bus to each selected station circuit first storing means in said distinct time slot.

5. A time division communication system wherein a plurality of time slots occurs in repetitive cycles according to claim 4 wherein said control signal generating means comprises a control circuit for producing control codes, a plurality of registers, each register connected to one associated station circuit comprising means for receiving a control code corresponding to the selected call connection in the distinct time slot from said control circuit, means for storing said control code and means responsive to said stored control code for generating and applying a control signal to said connected station circuit in the distinct time slot of each repetitive cycle.

6. A time division communication system wherein a plurality of time slots occurs in repetitive cycles according to claim 5 wherein said register receiving means comprises logic means for inserting a pulse into said first register in said distinct time slot prior to the transfer of signals between said selected stations, said register storing means comprising means for recirculating said inserted pulse once in each repetitive cycle, and said register generating and applying means comprises means responsive to said recirculating pulse for applying a plurality of control pulses to said connected station circuit in the distinct time slot of each repetitive cycle.

7. A time division communication system according to claim 4 wherein said second storing means comprises a second storage capacitor having two terminals, said first coupling means comprises first amplifying means having an input and first and second outputs, said first amplifying means being responsive to a signal applied to said input to provide identical signals on said first and second outputs, means for connecting said input to said first storing means, means for connecting said first output to one terminal of said second storage capacitor and to said station, and means for connecting said second output to the other terminal of said second storage capacitor.

8. A time division communication system according to claim 7 wherein said first storing means comprises a first storage capacitor having a first and second terminals, said first storage capacitor first terminal being connected to said first amplifying means input, said first storage capacitor second terminal being connected to said second coupling means, and further comprising a third storage capacitor having one terminal connected to a reference potential source, means for connecting the other third storage capacitor terminal to said first amplifying means second output, means responsive to said control signal being applied to said station circuit for disconnecting said third storage capacitor other terminal from said first amplifying means second output and for connecting said third storage capacitor other terminal to said first storage capacitor first terminal for a short time interval immediately following said distinct time slot.

9. A time division communication system according to claim 7 wherein said disconnecting means comprises first normally closed switching means connected between said first output and said second storage capacitor one terminal, second normally closed switching means connected between said second output and said second storage capacitor other terminal, and means responsive to said control signal being applied to said station circuit for opening said first and second normally closed switching means in said distinct time slot.

10. A time division communication system according to claim 9 wherein said second coupling means comprises a coupling impedance having one terminal connected to said first common bus, second amplifying measn having an input and an output, first normally open switching means connected between said econd amplifying means output and the other terminal of said coupling impedance, normally open switching means connected between said second storage capacitor one terminal and a reference potential source, and third normally open switching means connected between said second storage capacitor other terminal and said second amplying means input, and further comprising fourth normally open switching means connected between said second common bus and said first storing means, and means responsive to said control signal being applied to said station circuit for closing said first, second, third and fourth normally open switching means in said distinct time slot.

11. A time division communication system according to claim 10 wherein each normally open switching means and each normally closed switching means comprises an insulated gate field effect transistor (IGFET) having a source electrode, a drain electrode and a gate electrode; said first normally closed IGFET source electrode being connected to said first amplifying means first output, said first normally closed IGFET drain electrode being connected to said second storage capacitor one terminal and said first normally closed IGFET gate electrode being connected to said control signal applying means; said second normally closed IGFET source electrode being connected to said first amplifying means second output, said second normally closed IGFET drain electrode being connected to said second storage capacitor other terminal, and said second normally closed IGFET gate electrode being connected to said control signal applying means; said first normally open IGFET source electrode being connected to said second amplifying means output, said first normally open IGFET drain electrode being connected to said coupling impedance other terminal, and said first normally open IGFET gate electrode being connected to said control signal applying means; said second normally open IGFET source electrode being connected to said second storage capacitor one terminal, said second normally open IGFET drain electrode being connected to said reference potential source and said second normally open IGFET gate electrode being connected to said control signal applying means; said third normally open IGFET source electrode being connected to said second storage capacitor other terminal, said third normally open IGFET drain electrode being connected to said second amplifying means input, and said third normally open IGFET gate electrode being connected to said control signal applying means; said fourth normally open IGFET source electrode being connected to said second common bus, said fourth normally open IGFET drain electrode being connected to said first storing means and said fourth normally open IGFET gate electrode being connected to said control signal applying means.

12. A time division communication system wherein a plurality of time slots occurs in repetitive cycles comprising at least three stations, an incoming common bus, an outgoing common bus, each station having an associated circuit connected to said station and selectively connectible to said incoming bus and said outgoing bus, said circuit comprising means operative in a single time slot for coupling an outgoing signal from said station to said outgoing bus and means for coupling a signal from said incoming bus less said station outgoing signal to said station, and conferencing means for exchanging signals among more than two selected stations in a single portion distinct time slot comprising means operative in said single portion distinct time slot for coupling the outgoing signal from each selected station to said outgoing bus, means connected to said outgoing bus for producing a signal corresponding to the sum of said selected station outgoing signals appearing on said outgoing bus in said single portion distinct time slot, means connected between said producing means and said incoming bus for applying said produced signal to said incoming bus in said single portion distinct time slot, and means connected between said incoming bus and each selected station circuit for applying the produced sum signal from said incoming bus to each selected station circuit.

13. A time division communication system wherein a plurality of time slots occurs in repetitive cycles comprising at least three bidirectional communication paths, an incoming time division bus, an outgoing time division bus, each communication path having an associated hybrid circuit, said hybrid circuit being connected to said communication path and being selectively connectible to said incoming and outgoing time division buses in a single time slot and including means operative in said single time slot to couple only an outgoing signal from said communication path to said outgoing time division bus and means operative in said single time slot to couple a signal from said incoming bus less said communication path outgoing signal to said communication path, and conferencing means for exchanging signals among more than two selected communication paths in a single portion distinct time slot comprising means for coupling the outgoing signal from each selected hybrid circuit to said outgoing bus in said single portion distinct time slot, means connected to said outgoing time division bus for summing the selected hybrid circuit outgoing signals appearing on said outgoing time division bus in said single portion distinct time slot, means connected between said summing means and said incoming time division bus for applying the sum of said selected hybrid circuit outgoing signals appearing on said outgoing time division bus to said incoming time division bus in said single portion distinct time slot, and means connected between said incoming time division bus and each selected hybrid circuit for applying said sum signal to each selected hybrid circuit.

14. A time division communication system wherein a plurality of time slots occurs in repetitive cycles comprising a plurality of balanced lines each having first and second conductors, first and second common buses, a control signal source, each line being connected to an associated line circuit including a first store, means responsive to a control signal from said source being applied to said line circuit for applying a signal from said second bus to said first store, amplifying means having an input and first, second, third and fourth outputs operative in response to a signal on said input to produce equal signals of one phase on said first and third outputs and to produce equal signals of the opposite phase on said second and fourth outputs, said first store being connected to said input, said first line conductor being connected to said first output, said second line conductor being connected to said second output, a second store connected between said first and third outputs for storing the portion of the station signal from said first conductor, a third store connected between said second and fourth outputs for storing the portion of the line signal from said second conductor, means responsive to said control signal for applying said line signal from said second and third stores to said first common bus and said first store comprising means for disconnecting said second store from said first and third outputs, means for disconnecting said third store from said second and fourth outputs, means for serially connecting said second and third stores, means for coupling the output of said serially connected second and third stores to said first common bus, and means for applying the stored line signal in said serially connected second and third stores to said first store, and means for subtracting said stored line signal from said serially connected second and third stores from the signal applied from said second common bus to said first store, and means for exchanging signals among a plurality of selected lines in a distinct time slot comprising means for applying said control signal to each selected line circuit in said distinct time slot, means connected between said first common bus and said second common bus for summing the selected line circuit signals applied to said first bus, and means for applying said summed signals from said summing means to each selected line circuit first storing means via said second common bus.

15. A time division communication system wherein a plurality of time slots occurs in repetitive cycles according to claim 14 wherein said second store comprises a second storage capacitor having first and second terminals, said third store comprises a third storage capacitor having first and second terminals, said second storage capacitor first terminal is connected to said first output via first normally closed switching means, said second storage capacitor second terminal is connected to said third output via second normally closed switching means, said third storage capacitor first terminal is connected to said second output via third normally closed switching means, said third storage capacitor second terminal being connected to said fourth output via fourth normally closed switching means, and wherein said disconnecting means comprises means for applying said control signal to each of said first, second, third, and fourth normally closed switching means to open said first, second, third and fourth normally closed switching means whereby said second and third storage capacitors are disconnected from such first, second, third and fourth outputs during said distinct time slot.

16. A time division communication system wherein a plurality of time slots occurs in repetitive cycles according to claim 15 wherein each of said normally closed switching means comprises an IGFET switch having a source, a drain and a gate, said first normally closed IGFET switch drain being connected to said first output and said first normally closed IGFET switch source being connected to said second storage capacitor first terminal, said second normally closed IGFET switch drain being connected to said third output and said second normally closed IGFET switch source being connected to said second storage capacitor second terminal, said third normally closed IGFET switch drain being connected to said second output and said third normally closed IGFET switch source being connected to said third storage capacitor first terminal, said fourth normally closed IGFET switch drain being connected to said fourth output and said fourth normally closed IGFET switch source being connected to said third storage capacitor second terminal, and said first, second, third and fourth IGFET switch gates being connected to said control signal applying means.

17. A time division communication system wherein a plurality of time slots occurs in repetitive cycles according to claim 16 wherein said serially connecting means comprises first normally open switching means connected between a reference potential source and said second capacitor first terminal, second normally open switching means connected between said second capacitor second terminal and said third capacitor second terminal and third normally open switching means connected between said third capacitor first terminal and said coupling means, and means for applying said control signal to each of said first, second and third normally open switching means in said distinct time slot to close said first, second, and third normally open switching means in said distinct time slot.

18. A time division communication system wherein a plurality of time slots occurs in repetitive cycles according to claim 17 wherein each of said first, second and third normally open switching means comprises an IGFET switch, the first normally open IGFET switch drain being connected to said second capacitor first terminal and the first normally open IGFET switch source being connected to said reference potential source, said second normally open IGFET switch drain being connected to said second capacitor second terminal and said second normally open IGFET switch source being connected to said third capacitor second terminal, said third normally open IGFET switch drain being connected to the input of said coupling means and said third normally open IGFET switch source being connected to the third storage capacitor first terminal, and wherein the gates of each of said first, second and third normally open IGFET switches are connected to said control signal applying means.

19. A time division communication system according to claim 18 wherein said amplifying means comprises first, second and third IGFET devices, each having a source, a drain and a gate, said first IGFET device gate being connected to said first store, said first IGFET device source being said second output and also being connected to said second IGFET device gate, said first IGFET device drain being said first output and also being connected to said third IGFET device gate, said second IGFET device drain being said third output, and said third IGFET device drain being said fourth output.

20. A time division communication system according to claim 19 wherein said second IGFET device source is directly connected to said third IGFET device source.

21. A time division communication system according to claim 18 wherein said amplifying means comprises first second and third IGFET devices, each having a source, a drain and a gate, said first IGFET device gate being connected to said first store, said first IGFET source being said first output and also being connected to said third IGFET device gate, said first IGFET device drain being said second output and also being connected to said second IGFET device gate, said second IGFET device drain being said third output, and said third IGFET device drain being said fourth output.

22. A time division communication system according to claim 21 wherein said second IGFET device source is directly connected to said third IGFET device source.

23. A time division communication system according to claim 14 wherein said second store comprises a second storage capacitor, said third store comprises a third storage capacitor, said means for coupling the output of said serially connected second and third storage capacitors to said first common bus comprises a coupling capacitor, a second amplifier and a coupling impedance, first normally open switching means connected from the output of said serially connected second and third storage capacitors to one terminal of said coupling capacitor, said other coupling capacitor terminal being connected to the input of the second amplifier, second normally open switching means connected between the second amplifier output and one terminal of said coupling impedance and the other terminal of said coupling impedance being connected to said first common bus, said first and second normally open switching means being responsive to said control signal to close during said distinct time slot.

* * * * *

UNITED STATES PATENT OFFICE
CERTIFICATE OF CORRECTION

Patent No. 3,804,989 Dated April 16, 1974

Inventor(s) Robert L. Carbrey

It is certified that error appears in the above-identified patent and that said Letters Patent are hereby corrected as shown below:

Column 19, line 8, change "Cl" to --$\overline{\text{C}}$l--;

line 18, after "first" insert --storing--.

Claim 10, line 39, change "measn" to --means--;

line 40, change "econd" to --second--;

line 42, before "normally" insert --second--.

Signed and sealed this 1st day of October 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
★ U.S. GOVERNMENT PRINTING OFFICE 1969 O-366-334